(12) United States Patent
Custodero et al.

(10) Patent No.: US 8,999,513 B2
(45) Date of Patent: *Apr. 7, 2015

(54) PUNCTURE-RESISTANT AIR-IMPERMEABLE LAMINATE FOR AN INFLATABLE ARTICLE

(75) Inventors: Emmanuel Custodero, Chamalieres (FR); Pierre Lesage, Clermont-Ferrand (FR); Vincent Abad, Chamalieres (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 898 days.

This patent is subject to a terminal disclaimer.

(21) Appl. No.: 13/001,120

(22) PCT Filed: Jun. 3, 2009

(86) PCT No.: PCT/EP2009/003948
§ 371 (c)(1),
(2), (4) Date: Mar. 28, 2011

(87) PCT Pub. No.: WO2009/156049
PCT Pub. Date: Dec. 30, 2009

(65) Prior Publication Data
US 2011/0180193 A1 Jul. 28, 2011

(30) Foreign Application Priority Data
Jun. 24, 2008 (FR) ...................................... 08 54155

(51) Int. Cl.
*B29C 73/16* (2006.01)
*B29C 73/20* (2006.01)
*B32B 25/14* (2006.01)
(Continued)

(52) U.S. Cl.
CPC ............... *B29C 73/20* (2013.01); *B29C 73/163* (2013.01); *B32B 25/14* (2013.01); *B60C 1/0008* (2013.04); *B60C 5/14* (2013.01); *B60C 19/122* (2013.04); *C08L 53/02* (2013.01); *C08L 53/025* (2013.01); *B29L 2030/00* (2013.01); *C08L 21/00* (2013.01); *C08L 23/22* (2013.01); *Y10S 428/912* (2013.01)

(58) Field of Classification Search
None
See application file for complete search history.

(56) References Cited

U.S. PATENT DOCUMENTS 4,216,812 A * 8/1980 Bourne .................... 152/504
4,228,839 A * 10/1980 Bohm et al. ............. 152/504
(Continued)

FOREIGN PATENT DOCUMENTS

EP 1 060 870 12/2000
EP 1 090 069 B 7/2004
(Continued)

*Primary Examiner* — Elizabeth A Robinson
*Assistant Examiner* — Daniel D Lowrey
(74) *Attorney, Agent, or Firm* — Cozen O'Connor

(57) ABSTRACT

Airtight and puncture-resistant multilayer elastomer laminate that can be used in particular in an inflatable article, such as a pneumatic tire for a vehicle, comprising at least the following three layers (phr signifying parts by weight per hundred parts of rubber (elastomer) in each composition considered): as an airtight first layer, a first elastomer composition comprising at least 50 phr of a diene elastomer; as a puncture-resistant second layer, a self-sealing second elastomer composition comprising at least 50 phr of a saturated thermoplastic styrene elastomer and more than 200 phr of an extender oil; as an adhesive third layer or interphase between the above two layers, a third composition comprising at least 30 phr of an unsaturated thermoplastic styrene elastomer.

22 Claims, 1 Drawing Sheet

(51) Int. Cl.
  *B60C 1/00* (2006.01)
  *B60C 5/14* (2006.01)
  *B60C 19/12* (2006.01)
  *C08L 53/02* (2006.01)
  *B29L 30/00* (2006.01)
  *C08L 21/00* (2006.01)
  *C08L 23/22* (2006.01)

(56) References Cited

U.S. PATENT DOCUMENTS

| | | | |
|---|---|---|---|
| 5,618,882 A * | 4/1997 | Hammond et al. | 525/92 D |
| 6,329,459 B1 * | 12/2001 | Kang et al. | 524/505 |
| 6,397,910 B1 * | 6/2002 | Losey et al. | 152/209.6 |
| 8,602,075 B2 * | 12/2013 | Albert et al. | 152/503 |
| 8,609,758 B2 * | 12/2013 | Merino-Lopez et al. | 524/474 |
| 8,646,500 B2 * | 2/2014 | Custodero et al. | 152/502 |
| 2005/0184619 A1 * | 8/2005 | Chen | 310/309 |
| 2009/0068476 A1 * | 3/2009 | Kirino | |
| 2009/0311548 A1 * | 12/2009 | Kirino | |
| 2010/0051158 A1 * | 3/2010 | Albert et al. | |
| 2011/0198009 A1 * | 8/2011 | Merino-Lopez et al. | |

FOREIGN PATENT DOCUMENTS

| | | |
|---|---|---|
| EP | 1 714 802 | 10/2006 |
| FR | 2 886 581 | 12/2006 |
| FR | 2 910 478 A1 * | 6/2008 |
| WO | WO 9962998 A1 * | 12/1999 |
| WO | WO-2006/121140 A1 * | 11/2006 |
| WO | WO-2007/100021 A1 * | 9/2007 |
| WO | WO-2009/059709 A1 * | 5/2009 |

* cited by examiner

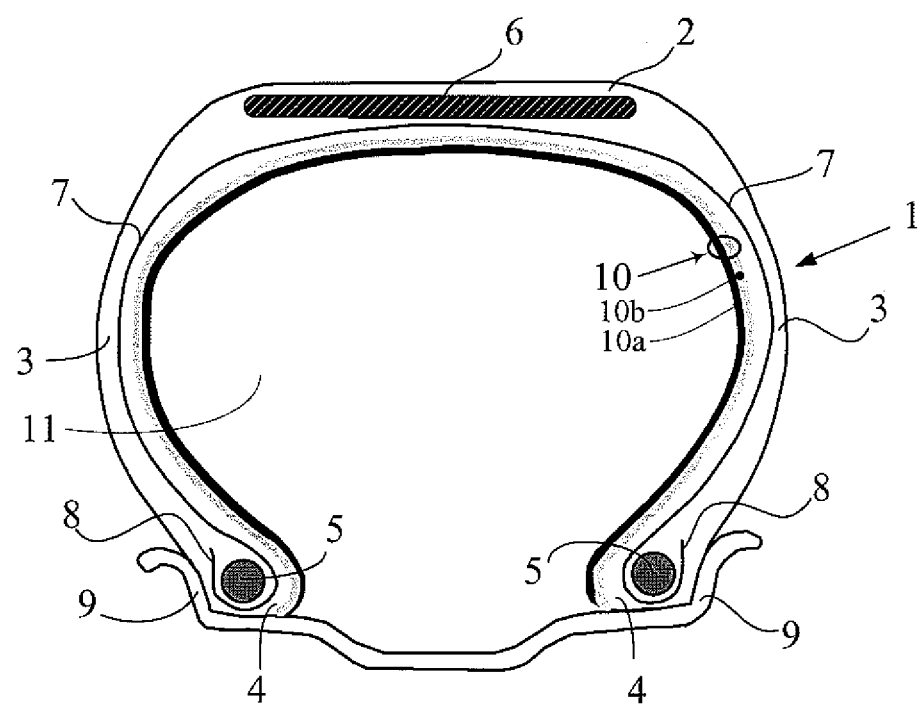

PUNCTURE-RESISTANT AIR-IMPERMEABLE LAMINATE FOR AN INFLATABLE ARTICLE

RELATED APPLICATION

This is a U.S. National Phase Application under 35 USC 371 of International Application PCT/EP2009/003948, filed on Jun. 3, 2009.

This application claims priority of French patent application no. 08/54155 filed Jun. 24, 2008, the entire content of which is hereby incorporated by reference.

FIELD OF THE INVENTION

The present invention relates to layers that are impermeable to the inflation gases, and also to self-sealing puncture-resistant layers intended for sealing off any holes due to perforations in service, and also to the use of such layers in inflatable articles.

The invention relates more particularly to the multilayer laminates that fulfil the above two functions, airtightness and puncture-resistance, intended in particular for pneumatic tires or inner tubes.

BACKGROUND OF THE INVENTION

In a conventional pneumatic tire of the "tubeless" type (that is to say of the type without an inner tube), the radially internal face comprises an airtight layer (or more generally a layer that is impermeable to any inflation gas) which enables the pneumatic tire to be inflated and kept under pressure. Its airtightness properties enable it to guarantee a relatively low rate of pressure loss, making it possible to keep the tire inflated, in the normal operating state, for a sufficient time, normally several weeks or several months. It also has the role of protecting the carcass reinforcement from diffusion of air coming from the internal space of the tire.

This role of airtight inner layer or "inner liner" is today essentially fulfilled by compositions based on an elastomer or butyl rubber, long renowned for their excellent airtightness properties.

Moreover, in recent years, pneumatic tire manufacturers have made particularly strenuous efforts to develop novel ways of solving a problem dating back from the very start of the use of wheels fitted with inflated pneumatic tires, namely how to allow a vehicle to continue to travel despite a substantial or total loss of pressure of one or more pneumatic tires. For decades, the spare wheel was considered to be the sole and universal solution. Then, more recently, the considerable advantages of possibly dispensing with the spare wheel have appeared. The concept of "extended mobility" was developed. The associated techniques allow the vehicle to run with the same pneumatic tire, dependent on certain limitations to be respected, after a puncture or a pressure drop. This makes it possible for example to get to a point of repair without having to stop, in often hazardous circumstances, to fit the spare wheel.

Self-sealing compositions that can achieve such an objective, which by definition are capable automatically, i.e. without any external intervention, of rendering a pneumatic tire airtight in the event of it being punctured by a foreign body, such as a nail, are particularly difficult to develop.

In order to be able to be used, a self-sealing layer must satisfy many conditions of a physical and chemical nature. It must in particular be effective over a very wide range of operating temperatures and over the entire lifetime of the pneumatic tires. It must be capable of sealing the hole when the puncturing body remains in place; following expulsion of the latter, it must be able to fill in the hole and render the pneumatic tire airtight.

Many solutions have been envisioned but have not been able to be developed in pneumatic tires for vehicles, in particular due to the lack of stability over time or lack of effectiveness under extreme operating temperature conditions.

To help to maintain good effectiveness at high temperature, document U.S. Pat. No. 4,113,799 (or FR-A-2 318 042) has proposed, as self-sealing layer, a composition comprising a combination of partially crosslinked butyl rubbers of high and low molecular weights, optionally in the presence of a small portion of a thermoplastic styrene elastomer. For good sealing effectiveness, said composition comprises from 55 to 70% by weight of a tackifying agent.

Document U.S. Pat. No. 4,228,839 has proposed, as self-sealing layer for a tire, a rubber compound containing a first polymer material that degrades when irradiated, such as polyisobutylene, and a second polymer material that crosslinks when irradiated, preferably a butyl rubber.

Document U.S. Pat. No. 4,426,468 has itself also proposed a self-sealing composition for a tire based on crosslinked butyl rubber of very high molecular weight.

A known drawback of butyl rubbers is that they suffer large hysteresis losses, furthermore over a wide temperature range, which drawback has repercussions on the layers or compositions themselves, whether they are of gastight type or of the self-sealing type, giving them a large increase in hysteresis and considerably degrading the rolling resistance of pneumatic tires using such compositions.

Reducing the hysteresis of gastight and self-sealing multilayer laminates, and therefore in fine the fuel consumption of motor vehicles, is a general objective that the current technology comes up against.

Moreover, the Applicants have observed that the self-sealing compositions based on butyl rubber may be insufficiently effective after the delayed expulsion or removal of a puncturing article left in place for a long period in the structure of the pneumatic tire.

Document EP-B 1-1 090 069 has indeed itself proposed self-sealing compositions that are free of butyl rubber, the specific formulation of which comprises, per 100 parts by weight of a styrene-based thermoplastic elastomer, 80 to 140 parts of a liquid plasticizer, 110 to 190 parts of a tackifying resin and from 2 to 20 parts of an additive.

A large amount of tackifying resin, besides the higher industrial cost that it induces for the tires, may itself also degrade the rolling resistance of the tires due to a risk of excessive stiffening of the self-sealing composition.

SUMMARY OF THE INVENTION

The Applicants have discovered, during their research, an airtight and puncture-resistant multilayer laminate that makes it possible to overcome the aforementioned drawbacks, with a self-sealing layer that requires neither butyl rubber nor the use of tackifying resins, and that has, in an inflatable article, a puncture-resistant performance that is improved relative to the self-sealing compositions of the prior art. In comparison with standard self-sealing compositions, it notably improves the rate of sealing of a hole after the removal, especially the delayed removal, of a puncturing article.

Thus, according to a first subject, the present invention relates to a puncture-resistant multilayer laminate that is impermeable to inflation gases that can be used in an inflatable article, characterized in that it comprises at least three layers (phr signifying parts by weight per hundred parts of rubber (elastomer) in each composition considered): as an airtight layer, a first elastomer composition comprising at least 50 phr of a diene elastomer; as a puncture-resistant layer, a self-sealing second elastomer composition comprising at least 50 phr of a saturated thermoplastic styrene elastomer and more than 200 phr of an extender oil; as an adhesive interphase between these two layers, a third composition comprising at least 30 phr of an unsaturated thermoplastic styrene elastomer.

The invention particularly relates to the use of such a laminate in an inflatable article such as a pneumatic tire, particularly when said composition or said laminate is placed on the inner wall of said inflatable article or pneumatic tire.

The present invention particularly relates to the use of the above laminate in pneumatic tires intended to be fitted on motor vehicles of the passenger type, SUV ("Sport Utility Vehicle") type, two-wheel vehicles (especially bicycles, motorcycles) and aircraft, such as industrial vehicles chosen from vans, heavy vehicles—i.e. underground trains, buses, road transport vehicles (lorries, towing vehicles, trailers), off-road vehicles such as agricultural and civil-engineering vehicles—, and other transport or handling vehicles.

The invention also relates, per se, to any inflatable article, in particular a pneumatic tire, comprising a laminate according to the invention.

BRIEF DESCRIPTION OF THE SINGLE DRAWING

The invention and its advantages will be readily understood in light of the description and the exemplary embodiments that follow, and also the single figure relating to these embodiments that shows schematically, in radial cross section, a pneumatic tire with radial carcass reinforcement using a self-sealing composition in accordance with the present invention.

DETAILED DESCRIPTION OF THE SINGLE DRAWING

In the present description, unless otherwise indicated, all the percentages (%) indicated are % by weight.

Moreover, any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

The multilayer laminate of the invention therefore has the essential feature of comprising at least three layers (phr signifying parts by weight per hundred parts of rubber(s) (elastomer(s)) in each layer or composition considered): as an airtight first layer, a first elastomer composition comprising at least 50 phr of a diene elastomer; as a puncture-resistant second layer, a self-sealing second elastomer composition comprising at least 50 phr of a saturated thermoplastic styrene (TPS) elastomer and more than 200 phr of an extender oil; as an adhesive interphase or third layer, positioned between the above two layers, a third composition comprising at least 30 phr of an unsaturated TPS elastomer.

It is recalled that the term "diene" elastomer or rubber should be understood, in a known manner, as meaning an elastomer resulting at least in part (i.e., a homopolymer or a copolymer) from diene monomers (monomers bearing two carbon-carbon double bonds which may or may not be conjugated) ; this elastomer is by definition of the unsaturated type since it still contains, after polymerization, at least one carbon-carbon double bond per initial diene unit.

The thermoplastic styrene (abbreviated to TPS) elastomers are themselves thermoplastic elastomers that are in the form of styrene-based block copolymers.

Having a structure intermediate between thermoplastic polymers and elastomers, they are constituted, in a known manner, of hard polystyrene blocks linked by soft elastomer blocks, for example polybutadiene, polyisoprene or poly(ethylene/butylene). They are often triblock elastomers with two hard segments linked by a soft segment. The hard and soft segments may be in a linear, star or branched configuration. These TPS elastomers may also be diblock elastomers with a single hard segment linked to a soft segment. Typically, each of these segments or blocks contains at least more than 5, generally more than 10 base units (for example styrene units and isoprene units for a styrene/isoprene/styrene block copolymer).

In the present application, by definition and in a known manner:
the term "saturated TPS elastomer" is understood to mean a TPS elastomer which does not comprise any ethylenically unsaturated groups (i.e. no carbon-carbon double bonds);
the term "unsaturated TPS elastomer" is understood to mean a TPS elastomer which is endowed with ethylenically unsaturated groups, that is to say which comprises carbon-carbon double bonds (which may or may not be conjugated).

I-1. Airtight Layer

As a first composition (airtight layer), use is made of any type of elastomer composition based on a diene elastomer capable of fulfilling the role of an airtight (or more generally gastight) film.

Preferably, this airtight layer has a thickness greater than 0.05 mm, more preferentially between 0.05 and 6 mm (for example from 0.1 to 2 mm).

Preferentially, the diene elastomer (predominant elastomer, by definition, in the airtight composition) is chosen from the group formed by polybutadienes (BR), synthetic polyisoprenes (IR), natural rubber (NR), butadiene copolymers, isoprene copolymers and blends of these elastomers. Such copolymers are more preferentially chosen from the group formed by butadiene-styrene copolymers (SBR), isoprene-butadiene copolymers (BIR), isoprene-styrene copolymers (SIR), isoprene-isobutylene copolymers (IIR), isoprene-butadiene-styrene copolymers (SBIR) and blends of such copolymers.

In other words, the diene elastomer of the first composition is preferentially chosen from the group formed by BR, IR, NR, SBR, BIR, SIR, IIR and SBIR elastomers and blends of such copolymers.

According to one particularly preferential embodiment, the first composition comprises a butyl rubber. The expression "butyl rubber" should be understood, in a known manner to mean a copolymer of isobutylene and isoprene (abbreviated to IIR), and also the halogenated versions, preferably chlorinated or brominated versions, of this type of copolymer.

Preferably, the butyl rubber is a halogenated butyl rubber or a blend of halogenated and non-halogenated butyl rubbers. The butyl rubber may be used alone or in combination with one or more other elastomer(s), especially diene elastomer(s) such as, for example natural rubber or a synthetic polyisoprene. Preferably, the content of butyl rubber in the first composition is greater than 70 phr, more preferentially within a range from 80 to 100 phr.

I-2. Puncture-Resistant Layer

As a puncture-resistant second layer, use is made of a self-sealing second composition having the essential feature of comprising at least 50 phr (that is to say from 50 phr to 100 phr) of a saturated TPS elastomer extended with more than 200 phr of oil.

Preferably, this puncture-resistant layer has a thickness greater than 0.3 mm, more preferentially between 0.5 and 10 mm (for example between 1 and 5 mm).

I-2-A. Saturated TPS Elastomer

Preferably, the saturated TPS elastomer (predominant elastomer, by definition, in the self-sealing composition) is chosen from the group formed by styrene/ethylene/butylene (SEB), styrene/ethylene/propylene (SEP), styrene/ethylene/ethylene/propylene (SEEP), styrene/ethylene/butylene/styrene (SEBS), styrene/ethylene/propylene/styrene (SEPS) and styrene/ethylene/ethylene/propylene/styrene (SEEPS) block copolymers, and blends of these copolymers.

More preferentially, said elastomer is chosen from the group formed by SEBS copolymers, SEPS copolymers and blends of these copolymers.

According to one preferential embodiment of the invention, the content of styrene, in each TPS elastomer described above (saturated and unsaturated) is between 5 and 50%. Below the indicated minimum, the thermoplastic nature of the elastomer runs the risk of being substantially reduced, whereas above the recommended maximum the elasticity of the composition may be adversely affected. For these reasons, the styrene content is more preferentially between 10 and 40%, in particular between 15 and 35%.

According to another preferential embodiment of the invention, the $T_g$ (measured by DSC (Differential Scanning Calorimetry) according to ASTM D3418, 1999) of the saturated TPS elastomer is below $-20°$ C., more preferentially below $-40°$ C. A $T_g$ value above these minimum temperatures, signifying a higher $T_g$ of the composition itself, may reduce the performances of the self-sealing composition when used at a very low temperature; for such a use, the $T_g$ of the saturated TPS elastomer is more preferentially still below $-50°$ C.

The number-average molecular weight (denoted by $M_n$) of the saturated TPS elastomer is preferentially between 50 000 and 500 000 g/mol, more preferentially between 75 000 and 450 000 g/mol. Below the minimum values indicated, the cohesion between the chains of the TPS elastomer, due to its dilution (amount of extender oil), runs the risk of being adversely affected; moreover, an increase in the usage temperature runs the risk of adversely affecting the mechanical properties, especially the properties at break, consequently leading to reduced "hot" performance. Moreover, too high a molecular weight $M_n$ may be detrimental as regards the flexibility of the composition, at the recommended extender oil contents. Thus, it has been observed that a value lying within a range from 250 000 to 400 000 g/mol was particularly suitable, especially for use of the self-sealing composition in a pneumatic tire.

The molecular weight $M_n$ is determined in a known manner by size Exclusion chromatography (SEC). The specimen is first dissolved in tetrahydrofuran to a concentration of about 1 g/l; then the solution is filtered on a filter of 0.45 µm porosity before injection. The apparatus used is a WATERS Alliance chromatograph. The elution solvent is tetrahydrofuran, the flow rate is 0.7 ml/min, the temperature of the system is 35° C. and the analysis time is 90 min. A set of four WATERS columns in series having the trade names STYRAGEL (HMW7, HMW6E and two HT6E) is used. The injected volume of the polymer specimen solution is 100 µl. The detector is a WATERS 2410 differential refractometer and its associated software for handling the chromatographic data is the WATERS MILLENNIUM system. The calculated average molecular weights are relative to a calibration curve obtained with polystyrene standards.

Saturated TPS elastomers, such as for example SEPS or SEBS, extended in particular with high levels of oils, are well known and commercially available. As examples of commercial saturated TPSs in extended form, mention may be made of the products sold by Vita Thermoplastic Elastomers or VTC ("VTC TPE group") under the name "Dryflex" (e.g. "Dryflex 967100") or "Mediprene" (e.g. "Mediprene 500 000M"), and those sold by Multibase under the name "Multiflex" (e.g. "Multiflex G00"). These products, developed in particular for medical, pharmaceutical or cosmetic applications, may be processed conventionally in respect of TPEs by extrusion or moulding, for example starting from a raw material available in bead or granule form. Of course, saturated TPS elastomers are also available in non-extended form. As examples, mention may be made of the elastomers of SEBS or SEPS type sold by Kraton under the name "Kraton G" (e.g. products G1650, G1651, G1654, G1730) or by Kuraray under the name "Septon" (e.g. S2005, S2006, S8004, S8006).

According to one preferential embodiment of the invention, the content of saturated TPS elastomer is greater than 70 phr, more preferentially within a range from 80 to 100 phr. The saturated TPS elastomer described above may advantageously constitute the whole of the elastomer matrix of the self-sealing composition (i.e. 100 phr).

I-2-B. Extender Oil

The second essential constituent of the self-sealing composition is an extender oil (or plasticizing oil) used in a very high amount of greater than 200 phr—i.e. more than 200 parts by weight per hundred parts of total elastomer (i.e., saturated TPS elastomer plus, where appropriate, additional elastomer(s))—, preferably greater than 250 phr.

Any extender oil may be used, preferably one having a weakly polar character, capable of extending or plasticizing elastomers, especially thermoplastic elastomers.

At ambient temperature (23° C.), these oils, which are relatively viscous, are liquids (i.e. as a reminder, substances having the capability of eventually taking the form of their container), as opposed especially to resins which are by nature solids.

Preferably, the extender oil is chosen from the group formed by polyolefin oils (i.e. those resulting from the polymerization of olefins, monoolefins or diolefins), paraffinic oils, naphthenic oils (of low or high viscosity), aromatic oils, mineral oils and mixtures of these oils.

More preferentially, the extender oil is chosen from the group formed by polybutenes, paraffinic oils and mixtures of these oils. Even more particularly, a polyisobutene oil, in particular a polyisobutylene ("PIB") oil, is used.

Examples of polyisobutylene oils include those sold in particular by Univar under the trade name "Dynapak Poly" (e.g. "Dynapak Poly 190"), by BASF under the trade names "Glissopal" (e.g. "Glissopal 1000") or "Oppanol" (e.g. "Oppanol B12"); paraffinic oils are sold for example by Exxon under the trade name "Telura 618" or by Repsol under the trade name "Extensol 51".

The number-average molecular weight ($M_n$) of the extender oil is preferentially between 200 and 30 000 g/mol, more preferentially still between 300 and 10 000 g/mol. For excessively low $M_n$ values, there is a risk of the oil migrating to the outside of the self-sealing composition, whereas excessively high $M_n$ values may result in this composition becoming too stiff. An $M_n$ value between 350 and 4000 g/mol, in particular between 400 and 3000 g/mol, proves to be an excellent compromise for the intended applications, in particular for use in a pneumatic tire.

The number-average molecular weight ($M_n$) of the extender oil is determined by SEC, the specimen being firstly dissolved in tetrahydrofuran to a concentration of about 1 g/l and then the solution is filtered on a filter of 0.45 µm porosity before injection. The apparatus is the WATERS Alliance chromatograph. The elution solvent is tetrahydrofuran, the flow rate is 1 ml/min, the temperature of the system is 35° C. and the analysis time is 30 min. A set of two WATERS columns with the trade name "STYRAGEL HT6E" is used. The injected volume of the polymer specimen solution is 100 The detector is a WATERS 2410 differential refractometer and its associated software for handling the chromatographic data is the WATERS MILLENNIUM system. The calculated average molecular weights are relative to a calibration curve obtained with polystyrene standards.

A person skilled in the art will know, in the light of the description and the exemplary embodiments that follow, how to adjust the quantity of extender oil according to the particular usage conditions of the self-sealing composition, in particular of the inflatable article in which it is intended to be used.

It is preferable for the extender oil content to be between 200 and 900 phr, more preferentially between 250 and 850 phr. Below the indicated minimum, the self-sealing composition runs the risk of having too high a stiffness for certain applications, whereas above the recommended maximum there is a risk of the composition having insufficient cohesion. For this reason, the extender oil content is more preferentially between 300 and 800 phr, especially for use of the self-sealing composition in a pneumatic tire.

I-3. Adhesive Interphase

As an adhesive third layer or interphase, positioned between the preceding two layers, use is made of an elastomer composition, the essential feature of which is to comprise at least 30 phr (that is to say from 30 phr to 100 phr), preferably at least 50 phr (that is to say from 50 phr to 100 phr) of a TPS elastomer of unsaturated type.

Preferably, the unsaturated TPS elastomer is chosen from the group formed by stiyrene/butadiene (SB), styrene/isoprene (SI), styrene/butadiene/butylene (SBB), styrene/butadiene/isoprene (SBI), styrene/butadiene/styrene (SBS), styrene/butadiene/butylene/styrene (SBBS), styrene/isoprene/styrene (SIS) and styrene/butadiene/isoprene/styrene (SBIS) block copolymers and blends of these copolymers. More preferentially, this unsaturated TPS elastomer is a triblock copolymer chosen from the group formed by styrene/butadiene/styrene (SBS), styrene/butadiene/butylene/styrene (SBBS), styrene/isoprene/styrene (SIS) and styrene/butadiene/isoprene/styrene (SBIS) block copolymers and blends of these copolymers.

According to another preferential embodiment of the invention, for the same reasons as those indicated previously for the saturated TPS elastomer, the styrene content of the unsaturated TPS elastomer is between 5 and 50%, more preferentially between 10 and 40%, in particular between 15 and 35%.

According to another preferential embodiment of the invention, for the same reasons as those indicated previously for the saturated TPS elastomer, the number-average molecular weight ($M_n$) of the saturated TPS elastomer is between 50 000 and 500 000 g/mol, more preferentially between 75 000 and 450 000 g/mol.

According to another particularly preferential embodiment of the invention, the content of unsaturated TPS elastomer is greater than 70 phr, more preferentially within a range from 80 to 100 phr. The saturated TPS elastomer described above may advantageously constitute the whole of the elastomer matrix of the composition (i.e. 100 phr).

Unsaturated TPS elastomers such as, for example SBS, SIS or SBBS, are also well known and commercially available, for example from Kraton under the name "Kraton D" (e.g., products D1161, D1118, D1116, D1163 for examples of SIS and SBS elastomers), from Dynasol under the name "Calprene" (e.g., products C405, C411, C412 for examples of SBS elastomers) or else from Asahi under the name "Tuftec" (e.g., product P1500 for an example of an SBBS elastomer).

Besides the unsaturated TPS elastomer described above, the adhesive third composition may or may not comprise, depending on the particular applications employed, a liquid plasticizing agent (which is liquid at ambient temperature, i.e. 23° C.), the role of which is to plasticize the unsaturated TPS elastomer and thus give more flexibility to the adhesive interphase.

If such a liquid plasticizing agent is used, it is present at a content preferentially between 0 and 100 phr, more preferentially between 5 and 50 phr, in particular within a range from 10 to 40 phr, ranges of values which represent an excellent compromise between ease of processing of the adhesive layer, on the one hand, and effectiveness of adhesion, on the other hand, of the adhesive layer to the two other layers of the laminate.

According to one particular embodiment of the invention, this liquid plasticizing agent may consist of an extender oil as described in the preceding section, especially chosen from the group formed by polybutene oils such as polyisobutylene oil, paraffinic oils and mixtures of these oils.

According to another particular embodiment of the invention, this liquid plasticizing agent may consist of a liquid elastomer, that is to say an elastomer having a low molecular weight, typically of less than 50 000, preferentially of less than 30 000 g/mol. It may be, in particular, a liquid diene elastomer such as IR, SBR, BR.

The thickness of the adhesive interphase, preferentially greater than 0.01 mm, may vary to a wide extent, for example between 0.01 and 0.5 mm, as a function, in particular, of the method of deposition of said adhesive layer on one and/or the other of the two layers described above. Deposition by sputtering will make it possible, for example, to achieve very fine thicknesses which may even be less than 10 µm. Advantageously, according to another particular embodiment of the invention, the adhesive layer is coextruded with the puncture-resistant layer.

I-4. Various Additives

The laminate of the invention may comprise various additives, especially those usually present in the airtight layers or the self-sealing layers known to a person skilled in the art, these additives typically being present in a small amount (preferentially at contents of less than 20 phr, more preferentially of less than 10 phr).

Mention will be made, for example, of reinforcing fillers such as carbon black or silica, non-reinforcing or inert fillers, colorants that can advantageously be used for colouring the compositions, platy fillers that further improve the impermeability (e.g. phyllosilicates such as kaolin, talc, mica, graphite, clays or modified clays ("organo clays")), protective agents such as antioxidants or antiozonants, UV stabilizers, various processing aids or other stabilizers, or else promoters capable of promoting adhesion of the laminate to the rest of the structure of the inflatable article.

Although the self-sealing composition, owing to its specific formulation, does not require the use of a plasticizing or tackifying hydrocarbon resin, the invention also applies to the case where such a resin would be used. In a manner known to a person skilled in the art, the term "resin" is reserved, by definition, for a compound that is, on the one hand, solid at ambient temperature (23° C.) (as opposed to a liquid plasticizing compound such as an oil) and, on the other hand, compatible (that is to say miscible at the content used) with the elastomer composition for which it is intended, so as to act a a true diluent.

As examples of such hydrocarbon resins, mention may be made of those chosen from the group formed by cyclopentadiene (abbreviated to CPD) or dicyclopentadiene (abbreviated to DCPD) homopolymer or copolymer resins, terpene homopolymer or copolymer resins, $C_5$-fraction homopolymer or copolymer resins and blends of these resins.

Besides the elastomers described above (diene first elastomer, saturated TPS second elastomer, unsaturated TPS third elastomer and where necessary other optional additional elastomers), the three layers described above could also comprise, still in a minority weight fraction relative to the main elastomer, polymers other than elastomers, such as for example thermoplastic polymers.

I-5. Use of the Laminate in a Pneumatic Tire

The laminate of the invention described above is an elastic solid compound (solid at 23° C.), which is especially characterized, owing to its specific formulation, .by a very high flexibility and very high deformability.

It can be used in any type of "inflatable" article, i.e. by definition, any article that assumes its usable shape when it is inflated with air.

As examples of such inflatable articles, mention may be made of inflatable boats, balloons or balls used for games or sports.

Said laminate is particularly suitable for use in an inflatable article, whether a finished or semi-finished product, made of rubber, most particularly in a pneumatic tire for a motor vehicle, such as a two-wheeled, passenger or industrial vehicle, or a non-motorized vehicle, such as a bicycle.

Such a laminate is preferentially placed on the inner wall of the inflatable article, completely or at least partly covering it, but it may also be completely integrated into its internal structure.

It will be readily understood that, depending on the specific fields of application and on the dimensions and pressures involved, the method of implementing the invention may vary, the airtight first layer, like the self-sealing second layer, in fact having several preferential thickness ranges. Thus, for example, in the case of pneumatic tires for passenger vehicles, they may have a thickness of at least 0.4 mm, preferentially between 0.6 and 2 mm. According to another example, in the case of pneumatic tires for heavy or agricultural vehicles, the preferential thickness may be between 1 and 3 mm. According to another example, in the case of pneumatic tires for vehicles in the civil engineering field or for aircraft, the preferential thickness may be between 2 and 10 mm.

Compared to the airtight and self-sealing laminates of the prior art, the laminate according to the invention has the advantage of exhibiting, over a very wide range of pneumatic tire operating temperatures, practically no degradation in rolling resistance compared with a pneumatic tire that does not include a self-sealing layer. Moreover, compared with the usual self-sealing compositions, the self-sealing composition of the laminate of the invention very substantially improves the rate of sealing of the hole, in particular after delayed removal of a puncturing object.

Moreover, the usual self-sealing compositions are very susceptible to creep. When pneumatic tires are running, said compositions are often expelled from the sidewall part of these tires due to the effect of the centrifugal forces and accumulate under their crown part. This is not the case for the compositions recommended by the present invention, which may be placed throughout the inner part of pneumatic tires.

The three layers of the above laminate may be assembled by any appropriate means, for example by a simple curing operation, preferably under pressure (for example about ten minutes at 150° C. under 16 bar).

Exemplary Embodiment of the Invention

The multilayer laminate of the invention can be advantageously used in the pneumatic tires of all vehicle types, particularly in tires for passenger vehicles which are capable of running at a very high speed or tires for industrial vehicles, such as heavy vehicles which are capable of running and operating under particularly high internal temperature conditions.

As an example, the single appended figure shows very schematically (not drawn to scale) a radial cross section of a pneumatic tire according to the invention.

This pneumatic tire 1 has a crown 2 reinforced by a crown reinforcement or belt 6, two sidewalls 3 and two beads 4, each of these beads 4 being reinforced with a bead wire 5. The crown 2 is surmounted by a tread (not shown in this schematic figure). A carcass reinforcement 7 is wound around the two bead wires 5 in each bead 4, the upturn 8 of this reinforcement 7 lying for example towards the outside of the pneumatic tire 1, which here is shown fitted onto its rim 9. The carcass reinforcement 7 consists, as is known per se, of at least one ply reinforced by cords, called "radial" cords, for example textile or metal cords, i.e. these cords are arranged practically parallel to one another and extend from one bead to the other so as to form an angle of between 80° and 90° with the circumferential mid-plane (the plane perpendicular to the rotation axis of the pneumatic tire, which is located at mid-distance of the two beads 4 and passes through the middle of the crown reinforcement 6).

The pneumatic tire 1 is characterized in that its inner wall includes a multilayer laminate (10) comprising at least two layers (10a, 10b), said laminate being self-sealing owing to its first layer (10a) and airtight owing to its second layer (10b).

In accordance with one preferential embodiment of the invention, the two layers (10a, 10b) cover substantially the entire inner wall of the pneumatic tire, extending from one sidewall to the other, at least as far as the rim flange when the pneumatic tire is in the fitted position. In other possible embodiments, the layer 10a could however cover only a portion of the airtight region (layer 10b), for example only the crown region of the pneumatic tire, or could extend at least from the crown region down to the shoulders or down to the mid-point of the sidewall (equator) of said tire.

According to another preferential embodiment, the laminate is placed in such a way that the self-sealing first layer (10a) is radially outermost in the pneumatic tire relative to the other layer (10b), as shown schematically in the appended figure. In other words, the self-sealing layer (10a) covers the airtight layer (10b) on the side facing the internal cavity 11 of the pneumatic tire 1. Another possible embodiment is that in which this layer (10a) is radially innermost, then placed between the airtight layer (10b) and the rest of the structure of the tire In this example, the layer 10b (with a thickness of 0.7 to 0.8 mm) is based on butyl rubber has a conventional formulation for an inner liner, which usually defines, in a conventional pneumatic tire, the radially internal face of said tire intended to protect the carcass reinforcement from diffusion of air coming from the internal space of the tire. This airtight layer 10b therefore enables the tire 1 to be inflated and kept under pressure. Its sealing properties enable it to guarantee a relatively low rate of pressure loss, making it possible to keep the tire inflated, in the normal operating state, for a sufficient time, normally several weeks or several months.

The layer 10a itself consists of a self-sealing composition comprising the two essential constituents which are an SEBS elastomer ("G1654" from Kraton) (with a styrene content of about 30%, a $T_g$ close to −60° C. and an $M_n$ value of around 150 000 g/mol) and a polyisobutylene extender oil ("Dynapak 190" from Univar—$M_n$ of around 1000 g/mol) with a weight content of about 550 phr.

The above self-sealing composition was prepared as follows. The two constituents (SEBS and oil) were mixed conventionally, using a twin-screw extruder (L/D=40), at a temperature typically above the melting point of the composition (around 190° C.). The extruder used comprised a feed (hopper) for the SEBS and a pressurized liquid injection pump for the polyisobutylene extender oil; it was provided with a die enabling the product to be extruded to the desired dimensions.

The layer 10a, therefore placed between the layer 10b and the cavity 11 of the pneumatic tire, is provides the pneumatic tire with effective protection against pressure losses due to accidental perforations, by enabling these perforations to be automatically sealed.

If a foreign body such as a nail passes through the structure of the inflatable article, for example a wall such as a sidewall 3 or the crown 6 of the pneumatic tire 1, the composition serving as self-sealing layer is subjected to several stresses. In reaction to these stresses, and owing to its advantageous deformability and elasticity properties, said composition creates an airtight contact region around the entire body. It matters little whether the outline or profile of said body is uniform or regular, the flexibility of the self-sealing composition enabling it to penetrate into minute openings. This interaction between the self-sealing composition and the foreign body rendering the region affected by the latter airtight.

In the event of the foreign body being removed, whether accidentally or intentionally, a perforation remains, which can generate a relatively substantial leak, depending on its size. The self-sealing composition, exposed to the hydrostatic pressure, is sufficiently flexible and deformable to close up, by deforming, the perforation, preventing the inflation gas from leaking out. Especially in the case of a pneumatic tire, it has turned out that the flexibility of the self-sealing composition makes it possible to withstand, without any problem, the forces from the surrounding walls, even during deformation phases of the pneumatic tire when loaded and running.

Placed between the layers 10a and 10b is an adhesive interphase, which is not shown in FIG. 1, for simplification, due to its very fine thickness (equal to 0.25 mm). This third layer, free of liquid plasticizing agent, is constituted of SIS elastomer (Kraton D1161); it was obtained by extrusion like the preceding layer 10a.

The pneumatic tire provided with its airtight and puncture-resistant layer (10) as described above may advantageously be produced before vulcanization (curing). The laminate is simply applied in a conventional manner at the desired place. The vulcanization is then carried out conventionally. The diene and TPS elastomers are well able to withstand the stresses associated with the vulcanization step. An advantageous manufacturing variant, for a person skilled in the art of pneumatic tires, would consist for example during a first step in laying down flat, together or separately, the puncture-resistant layer and the adhesive interphase directly on a building drum, in the form of a two-layer final structure of suitable thickness (for example 2 to 6 mm), before this is covered with the airtight layer followed by the rest of the structure of the pneumatic tire, according to the manufacturing techniques well known to a person skilled in the art.

The invention claimed is:

1. An airtight and puncture-resistant multilayer elastomer laminate that can be used in particular in an inflatable article, comprising at least the following three layers (phr signifying parts by weight per hundred parts of rubber (elastomer) in each composition considered):
   as an airtight first layer, a first elastomer composition comprising at least 50 phr of a diene elastomer;
   as a puncture-resistant second layer, a self-sealing second elastomer composition comprising at least 50 phr of a saturated thermoplastic styrene (abbreviated to TPS) elastomer and more than 200 phr of an extender oil; and
   as an adhesive interphase or third layer, positioned between the above two layers, a third composition comprising at least 30 phr of an unsaturated TPS elastomer.

2. The laminate according to claim 1, wherein the diene elastomer of the first composition is selected from the group consisting of polybutadienes, synthetic polyisoprenes, natural rubber, butadiene copolymers, isoprene copolymers and blends of these elastomers.

3. The laminate according to claim 2, wherein the diene elastomer of the first composition is a butyl rubber.

4. The laminate according to claim 1, wherein any the saturated TPS elastomer of the second composition is selected from the group consisting of styrene/ethylene/butylene (SEB), styrene/ethylene/propylene (SEP), styrene/ethylene/ethylene/propylene (SEEP), styrene/ethylene/butylene/styrene (SEBS), styrene/ethylene/propylene/styrene (SEPS) and styrene/ethylene/ethylene/propylene/styrene (SEEPS) copolymers, and blends of these copolymers.

5. The laminate according to claim 4, wherein the saturated TPS elastomer is selected from the group consisting of SEBS copolymers, SEPS copolymers and blends of these copolymers.

6. The laminate according to claim 1, wherein the unsaturated TPS elastomer of the third composition is selected from the group consisting of styrene/butadiene (SB), styrene/isoprene (SI), styrene/butadiene/butylene (SBB), styrene/butadiene/isoprene (SBI), styrene/butadiene/styrene (SBS), styrene/butadiene/butylene/styrene (SBBS), styrene/isoprene/styrene (SIS) and styrene/butadiene/isoprene/styrene (SBIS) block copolymers and blends of these copolymers.

7. The laminate according to claim 1, wherein the content of saturated TPS elastomer of the second composition is greater than 70 phr.

8. The laminate according to claim 1, wherein the content of unsaturated TPS elastomer of the third composition is at least equal to 50 phr.

9. The laminate according to claim 1, wherein each saturated and unsaturated TPS elastomer comprises between 5 and 50% by weight of styrene.

10. The laminate according to claim 1, wherein the number-average molecular weight ($M_n$) of each saturated and unsaturated TPS elastomer is between 50,000 and 500,000 g/mol.

11. The laminate according to claim 1, wherein the extender oil of the second composition is selected from the group consisting of polyolefin oils, paraffinic oils, naphthenic oils, aromatic oils, mineral oils and mixtures of these oils.

12. The laminate according to claim 11, wherein the extender oil of the second composition is selected from the group consisting of polybutene oils, paraffinic oils and mixtures of these oils.

13. The laminate according to claim 12, wherein the extender oil of the second composition is a polyisobutylene oil.

14. The laminate according to claim 1, wherein the number-average molecular weight of the extender oil of the second composition is between 200 and 30,000 g/mol.

15. The laminate according to claim 1, wherein the content of extender oil of the second composition is between 200 and 900 phr.

16. The laminate according to claim 1, wherein the third composition comprises a liquid plasticizing agent, in a content between 0 and 100 phr.

17. The laminate according to claim 16, wherein the liquid plasticizing agent of the third composition is an extended oil selected from the group consisting of polyolefin oils, paraffinic oils, naphthenic oils, aromatic oils, mineral oils and mixtures of these oils.

18. The laminate according to claim 16, wherein the liquid plasticizing agent of the third composition is a liquid elastomer.

19. An inflatable article comprising the airtight and puncture-resistant laminate according to claim 1.

20. The inflatable article according to claim 19, wherein the airtight and puncture-resistant laminate is deposited on the inner wall of the inflatable article.

21. The inflatable article according to claim 19 wherein said article is a rubber article.

22. The inflatable article according to claim 19, wherein said article is a pneumatic tire for a vehicle.

\* \* \* \* \*